(12) United States Patent
Zhou et al.

(10) Patent No.: US 8,534,900 B2
(45) Date of Patent: Sep. 17, 2013

(54) INTERLEAVED LIGHTING SYSTEM FOR 2D-3D DISPLAY HAVING ORTHOGONALLY ARRANGED LIGHT EXTRACTION FEATURES

(75) Inventors: Ying Zhou, Spring, TX (US); Daniel K. Van Ostrand, Conroe, TX (US)

(73) Assignee: Unipixel Displays, Inc., The Woodlands, TX (US)

( * ) Notice: Subject to any disclaimer, the term of this patent is extended or adjusted under 35 U.S.C. 154(b) by 265 days.

(21) Appl. No.: 13/072,159

(22) Filed: Mar. 25, 2011

(65) Prior Publication Data
US 2012/0243259 A1    Sep. 27, 2012

(51) Int. Cl.
*G02B 6/26* (2006.01)
(52) U.S. Cl.
USPC ............ 362/617; 362/615; 362/618; 362/619
(58) Field of Classification Search
USPC ............ 362/600–634; 359/566–576; 349/65
See application file for complete search history.

(56) References Cited

U.S. PATENT DOCUMENTS

| 5,742,433 | A | * | 4/1998 | Shiono et al. | 359/575 |
| 7,085,056 | B2 | * | 8/2006 | Chen et al. | 359/566 |
| 7,192,175 | B2 | * | 3/2007 | Parikka et al. | 362/606 |
| 7,537,373 | B2 | * | 5/2009 | Liao | 362/619 |
| 8,215,818 | B2 | * | 7/2012 | Morbieu et al. | 362/612 |
| 2011/0006979 | A1 | | 1/2011 | Min et al. | |
| 2013/0063980 | A1 | * | 3/2013 | Ender | 362/611 |

FOREIGN PATENT DOCUMENTS

WO    WO 2006034943 A1 *    4/2006

\* cited by examiner

*Primary Examiner* — Robert May
(74) *Attorney, Agent, or Firm* — Conley Rose, P.C.

(57) ABSTRACT

A light guide plate for a backlight comprises a light transmissive medium. The light transmissive medium preferably has two pairs of opposing sides and a top surface. Also provided is a plurality of interleaved regions of elongated light extraction features on the top surface of the light transmissive medium. Each light extraction figure is configured to extract light injected into the light guide plate and into a direction away from the top surface of the light guide plate. Each elongated light extraction feature has a long dimension and a short dimension. The light extraction features in a first set of the regions are arranged with their long dimension orthogonal to the long dimension of the light extraction features in a second set of the regions.

27 Claims, 11 Drawing Sheets

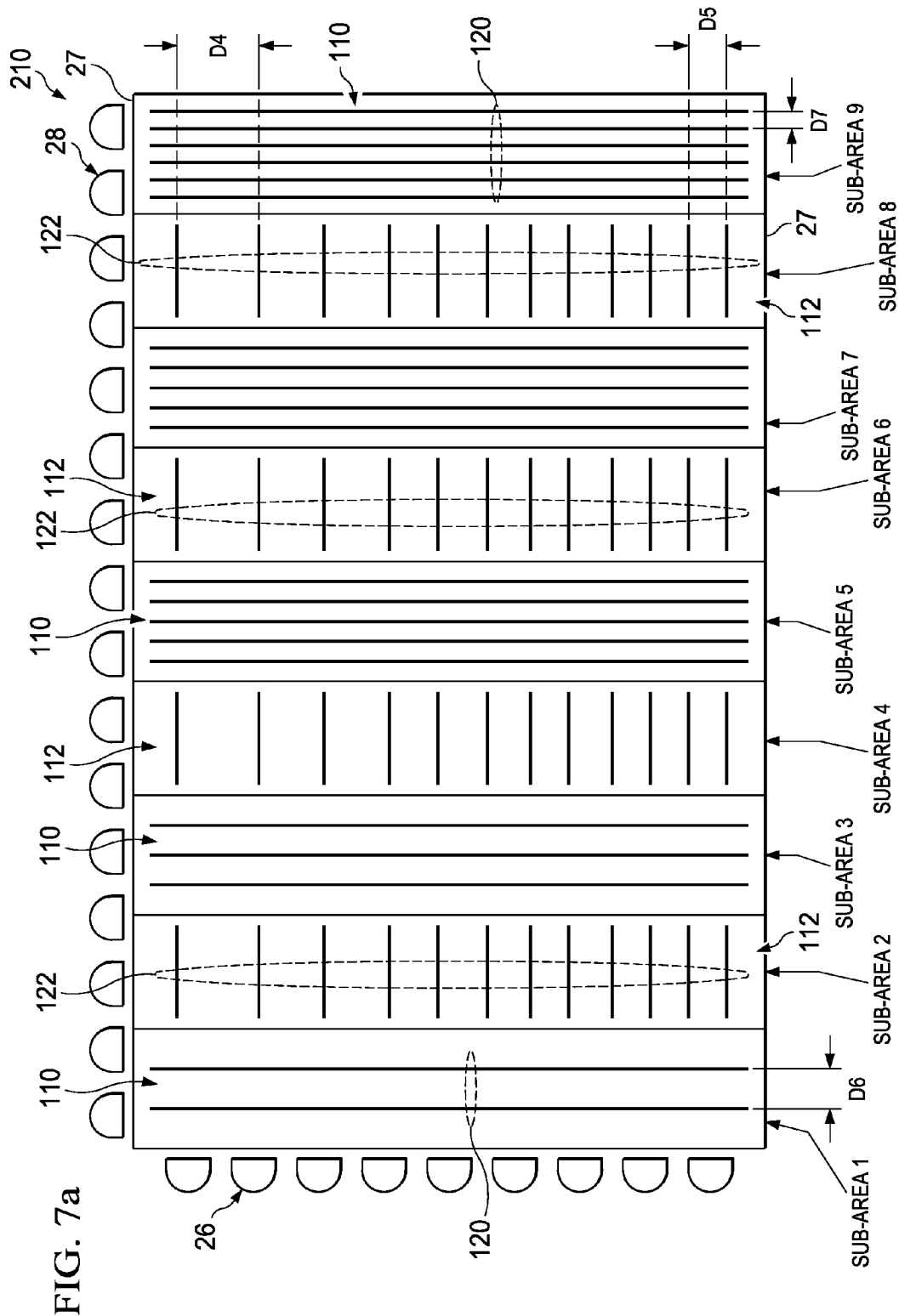

INTERLEAVED LIGHTING SYSTEM FOR 2D-3D DISPLAY HAVING ORTHOGONALLY ARRANGED LIGHT EXTRACTION FEATURES

BACKGROUND

Demand for three dimensional (3-D) displays (computer displays, TV monitors, etc.) has increased. Some 3-D displays require the viewer to wear special glasses. Such glasses are cumbersome and thus generally undesirable. Other 3-D systems include a parallax barrier as part of the display. Front parallax barriers, however, block light from certain pixels reaching one of the eyes and thus overall brightness may be significantly reduced.

SUMMARY

Various embodiments of a display system are described herein that are capable of two-dimensional (2-D) or 3-D operation. 3-D operation is possible without the use of parallax barrier and without the viewer wearing special glasses.

Some embodiments are directed to a light guide plate for a backlight. The light guide plate comprises a light transmissive medium. The light transmissive medium preferably has two pairs of opposing sides and a top surface. Also provided is a plurality of interleaved regions of elongated light extraction features on the top surface of the light transmissive medium. Each light extraction figure is configured to extract light injected into the light guide plate and into a direction away from the top surface of the light guide plate. Each elongated light extraction feature has a long dimension and a short dimension. The light extraction features in a first set of the regions are arranged with their long dimension orthogonal to the long dimension of the light extraction features in a second set of the regions.

Other embodiments are directed to a lighting system for a display. The lighting system comprises a light guide plate having two pairs of opposing sides. The light guide plate comprises interleaved regions of elongated light extraction features. Each elongated light extraction feature has a long dimension and a short dimension. The light extraction features in a first set of regions are arranged with their long dimension orthogonal to the long dimension of the light extraction features in a second set of regions. The lighting system also comprises a first light array adjacent a first side and a second light array adjacent a second side orthogonal to the first side.

Yet other embodiments are directed to a display that comprises an active display unit and a light guide plate separated from the active display unit by a distance. The light guide plate has two pairs of opposing sides and comprises interleaved regions of elongated light extraction features. Each elongated light extraction feature has a long dimension and a short dimension. The light extraction features in a first set of regions are arranged with their long dimension orthogonal to the long dimension of the light extraction features in a second set of regions. The display comprises a first light array adjacent a first side of the light guide plate and a second light array adjacent a second side of the light guide plate and orthogonal to the first side.

BRIEF DESCRIPTION OF THE DRAWINGS

For a detailed description of exemplary embodiments of the invention, reference will now be made to the accompanying drawings in which:

FIGS. 7a and 7b illustrate embodiments of light guide plates in which the spacing between adjacent light extraction features is not uniform across the entire light guide plate;

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
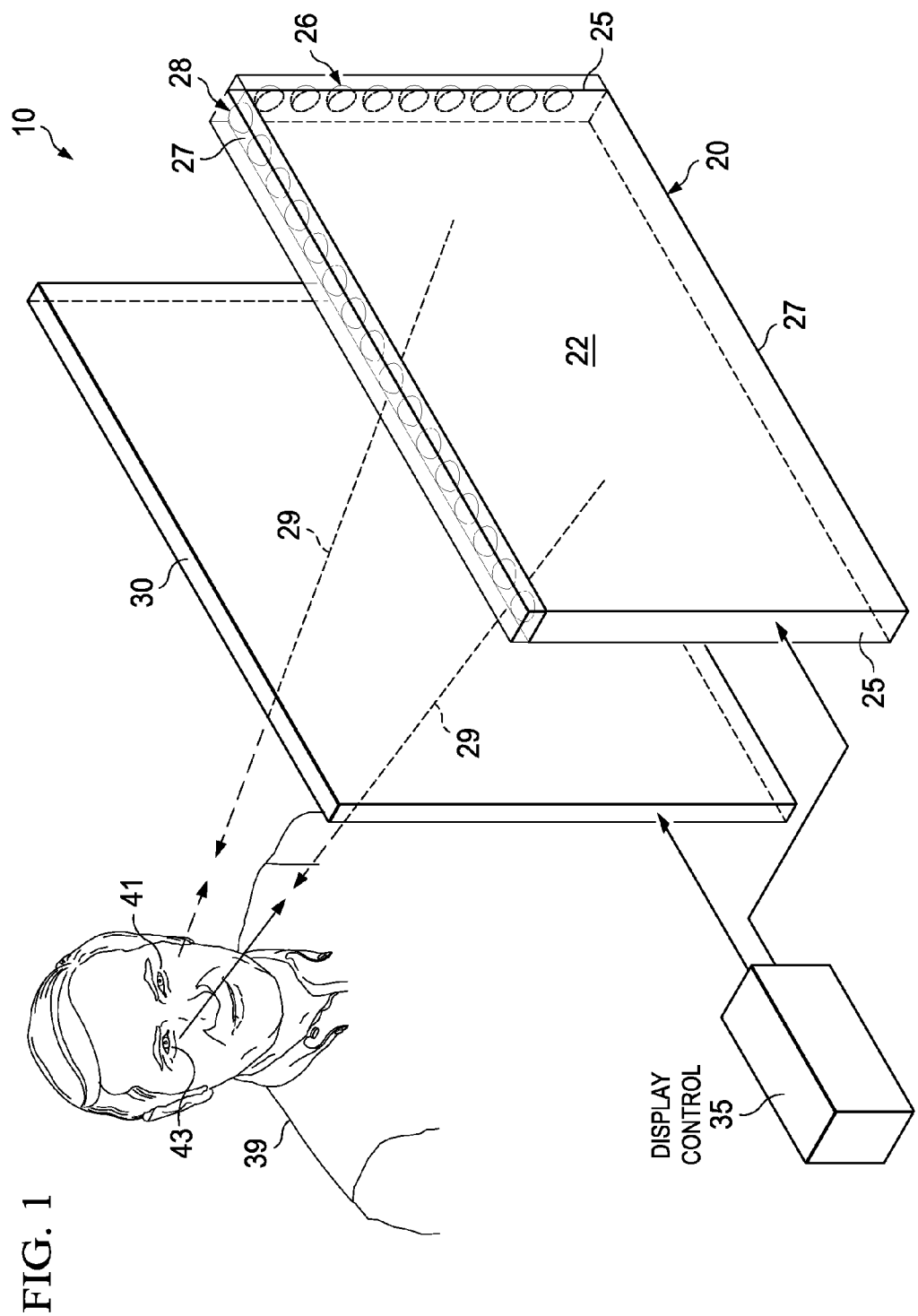
FIG. 1 shows a display comprising a parallax lighting system in accordance with various preferred embodiments of the invention.

FIG. 1 illustrates a display system 10 in accordance with a preferred embodiment of the invention. The display system 10 is selectively capable of both 2-D and 3-D imaging. Preferably, the display system 10 includes a lighting system 20 that generates light that shines through the pixels of active display 30 toward the left and right eyes 41 and 43 of a viewer 39. The display system 10 also comprises, or is coupled to, a display control 35 which controls the lighting system 20 and active display 30. The preferred embodiments of the display system 10 described herein does not require a parallax barrier for 3-D operation nor are special glasses required.

The lighting system 20 comprises a light guide plate 22 and light arrays 26 and 28. The light guide plate 22 comprises two pairs of opposing sides 25 and 27. The light arrays 26 and 28 preferably comprise light emitting diodes (LEDs) positioned on at least two orthogonal sides 25, 27 of the light guide plate 22. The light guide plate 22 comprises a light transmissive medium such as glass or plastic. Light from the LEDs is injected from the sides of the light guide plate 22 into the interior of the plate 22. The injected light propagates through the interior light guide plate 22 in accordance with total internal reflection (TIR) principles. Light extraction features (shown in many of the figures but not in FIG. 1) formed, or otherwise provided on the surface of, the light guide plate 22 function to cause the light internal to the light guide plate 22 to be extracted from the light guide plate and into a direction away from the surface of the plate as illustrated by exemplary light rays 29.

Figure 2:
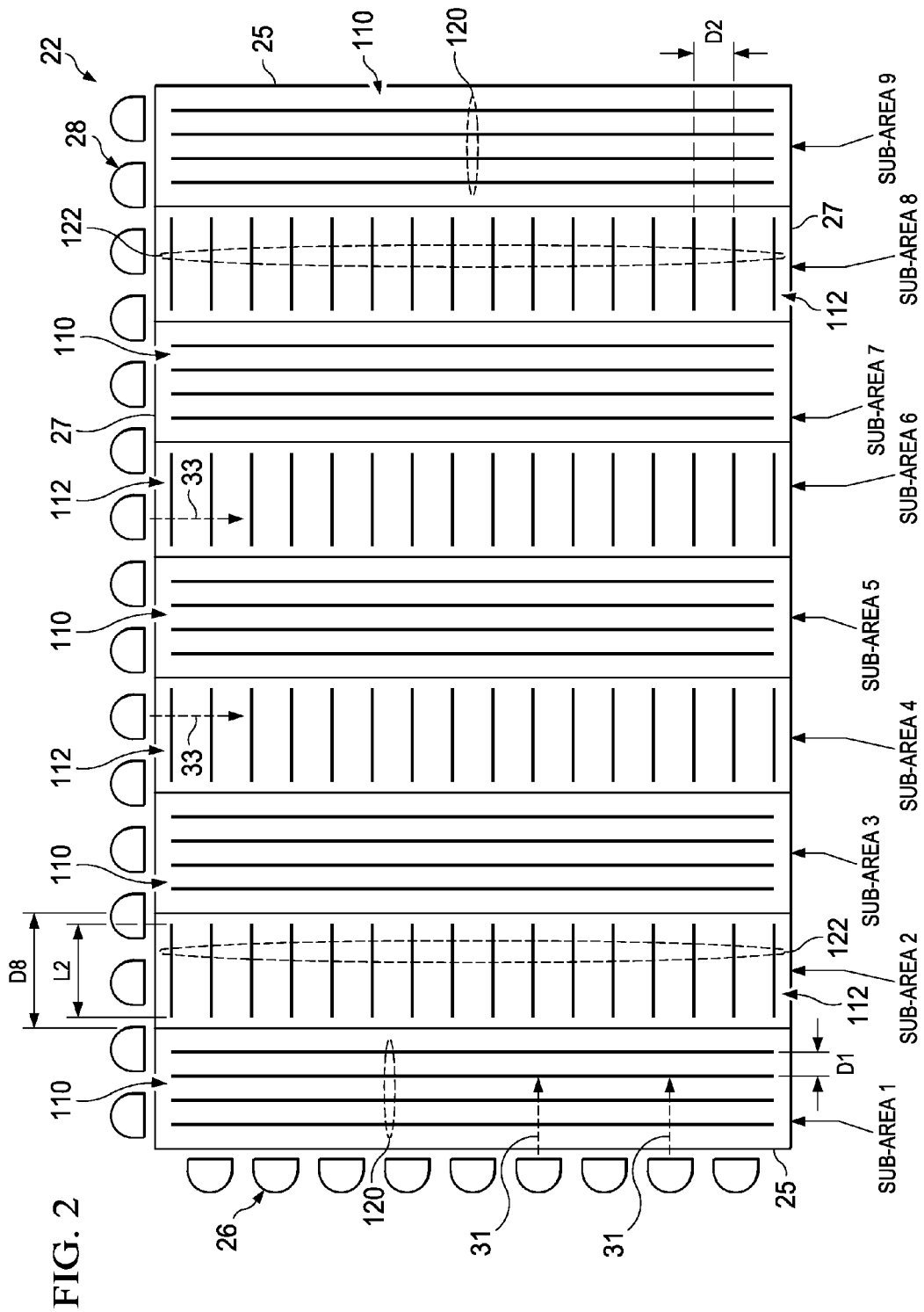
FIG. 2 illustrates one embodiment of the parallax lighting system.

FIG. 2 illustrates an embodiment of the light guide plate 22 and light arrays (also called LED arrays) 26 and 28. Each LED array 26, 2 comprises one or more LEDs arranged along a side of the light guide plate. The LEDs inject light into the plate.

The light guide plate 22 is divided into alternating regions 110, 112 and each region comprises a plurality of light extraction features 120, 122. As can be seen, the light extraction features in each region 110, 112 are elongated (i.e., one dimension is longer than the other dimension—a short dimension) and are arranged in a parallel relationship. As between adjacent regions 110, 112, the light extraction features in one region are arranged with their long dimension orthogonal to the long dimension of the light extraction features in an adjacent region. The regions 110, 112 of light extraction features are generally interleaved (i.e., alternating) from one side of the light guide plate to the other, although in some embodiments two or more of the same regions 110 or the same regions 112 may abut each other. Regions 110 comprise light extraction features 120 that are all arranged in the same orientation, and regions 112 comprise light extraction features 122 also all arranged in the same orientation albeit orthogonal compared to light extraction features 120 in regions 110.

The elongated light extraction features 120 in regions 110 are arranged with their long dimension parallel to sides 25. In the embodiment of FIG. 1, the elongated light extraction features 120 of regions 110 extend more than half the length of the sides 25 and preferably substantially the entire length (e.g., 90%) of sides 25. The light extraction features 120 are parallel and in the embodiment of FIG. 1 are uniformly spaced. That is, the spacing D1 between adjacent light extraction features 120 is the same within a given region 110 and is the same among all of the regions 110.

The elongated light extraction features 122 of alternating regions 112 are arranged in a parallel fashion as well with the spacing D2 between adjacent light extraction features 122 being the same within a given region 112 and among all of the regions 112 in the embodiment of FIG. 2. The light extraction features 122 are arranged with their long dimension parallel to sides 27. The length of each light extraction feature does not extend most of the length of sides 27 as is the case of light extraction features 120 with respect to sides 25. The rear parallax pitch, D8, is related to the distance between the backlight and the active display, pixel size of active display, viewing distance and the separation between human eyes. D8 preferably is much smaller than the width of region 112. The length L2 can be equal or smaller than D8, but generally is at least 70% of the width of D8.

Light 31 from LED array 26 is injected from the side 25 into the light guide plate 22 and thus in a direction generally perpendicular to the long dimension of light extraction features 120 and generally parallel to the long dimension of light extraction features 122. Similarly, light 33 from LED array 28 is injected from the top side 27 into the light guide plate 22 and thus in a direction generally perpendicular to the long dimension of light extraction features 122 and generally parallel to the long dimension of light extraction features 120.

Each LED in arrays 26 and 28 preferably comprises a three-LED device capable of producing any of a variety of colors under control of the display control 35. The display control 35 can cause the color light produced by LED array 26 to be different from, or the same as, the color produced by orthogonal LED array 28. For 2-D operation, the colors of the LED arrays 26, 28 are the same (and preferably white light), while for 3-D operation, the colors preferably are different, but complimentary, between the two arrays.

Figure 3:
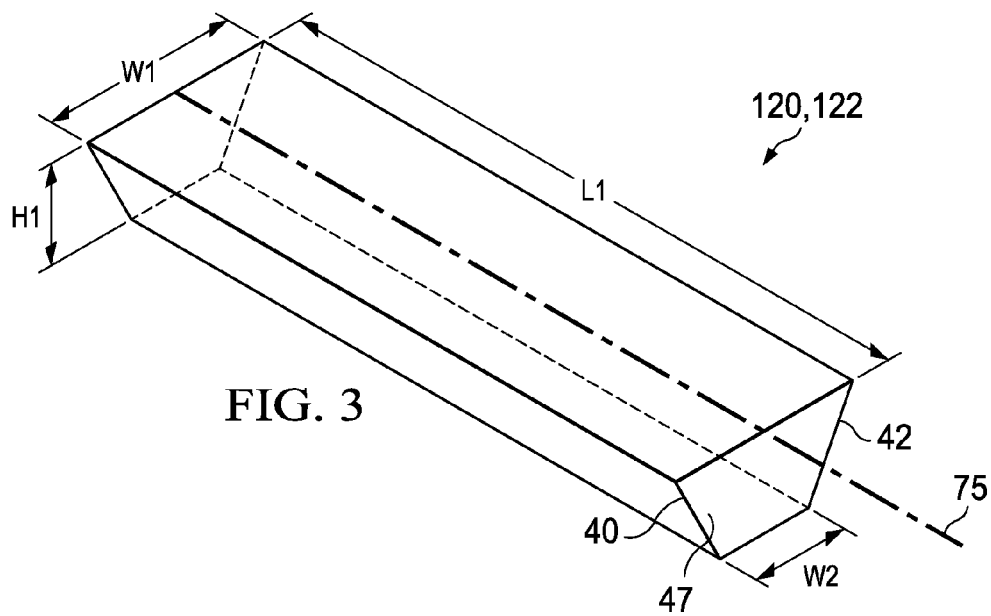
FIG. 3 depicts a single light extraction feature.

FIG. 3 shows an example of a light extraction feature which can be used in either or both of the alternating regions 110, 112 of light extraction features 120, 122. The light extraction feature in the example of FIG. 3 is a trapezoidal frustum. The length is represented by L1 (mentioned above as the long dimension) and the height by H1. The width of the long side of trapezoidal cross-section is represented as W1 and the width of the trapezoid's short side is W2. Either of widths W1 or W2 represents the short dimension noted above. The dimensions of L1, H1, W1, and W2 can be customized to suit varying desires and applications. In some embodiments, however, L1 is in the range of 4 to 1000 microns, H1 is in the range of 1.5 to 105 microns, W1 is in the range of 4 to 400 microns, and W2 is in the range of 2 to 150 microns. Axis 75 is also shown extending along the length L1 of the light extraction feature 70. The short side (W2) is the side that contacts the light guide plate 22.

In general, the light extraction features 120, 122 are as long as possible so that only the side face of the features facing the corresponding LED array redirects the light towards the viewer effectively. The end faces (e.g., faces 47) of the opposing sides are small so as to suppress the light extracted from those areas by the other LED array.

Figure 4:
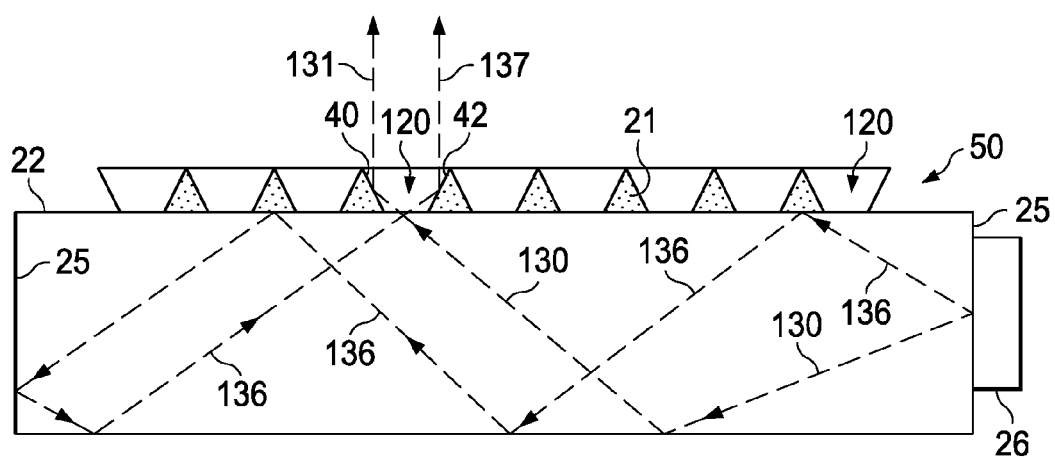
FIG. 4 illustrates the operation of the light extraction features to extract light injected into a light guide plate.

FIG. 4 illustrates a schematic of a side view of the light guide plate 22 on which light extraction features 120 are provided. The following explanation applies as well to the interaction of the light guide plate and light extraction features 122. The light extraction features 120 may be provided as part of a film 50 which is adhered to the top surface of the light guide plate 22.

The shaded triangular regions 21 between light extraction features 120 represents air. A single light source (e.g., LED) 26 is shown to the right and injects light into the light guide plate 22. The direction of travel of two light waves is shown with reference numerals 130 and 136. Light wave 130 reflects off the bottom surface of the light guide plate and then proceeds to contact one of the light extraction features 120 which causes the light to be extracted from the waveguide. Each light extraction feature 120 comprises two angled side surfaces 40 and 42 as shown and as discussed with respect to FIG. 3. Light wave 130 contacts the distal side surface 40 (distal with respect to the light source 26). The angle of the side surface 40 is set so that the light 131 that reflects off that surface exits the film 50 in a direction that is generally perpendicular to the plane of the light guide plate 22.

Light wave 136 also reflects off of the bottom surface of the light guide plate 22 and then contacts the top surface but not at a location occupied by a light extraction feature 120. Instead, wave 136 contacts the top surface of the light guide plate corresponding to air 21. The total internal reflection nature of the light guide plate 22 causes the light wave 136 to reflect off the bottom and top surfaces until it contacts the opposing side 25 which may be a mirrored surface thereby again causing the light to reflect off that surface. The light 136 then begins traversing back through the light guide plate until it contacts a light extraction feature 120 as shown. The extracted light contacts proximal side surface 42 which reflects the light (light 137) at a direction generally perpendicular to the plane of the light guide plate 22. In this way, the light extraction features 120 cause the light to be extracted from the light guide plate 22. The light extracted from the light guide plate is used to illuminate liquid crystal pixels activated in the active display 30 (FIG. 1).

As explained above regarding FIG. 2, the light extraction features 120, 122 are arranged in alternating regions 110, 112. Light injected from side 25 via LED array 26 is extracted mainly by light extraction features 120 in regions 110, while light injected from orthogonal side 27 via LED array 28 is extracted mainly by light extraction features 122 in regions 112. As the color emitted by LED array 26 is different than the color emitted by LED array 28 for 3-D mode, regions 110 emit a different color light than interleaved regions 112. The overall result is a series of alternating color bands.

The embodiment of the light guide 22 shown in FIG. 2 comprises five regions 110 interleaved with four regions 112 with orthogonally arranged light extraction features. The five regions 110 are labeled as sub-areas 1, 3, 5, 7, and 9 and the four alternating regions 112 are labeled as sub-areas 2, 4, 6, and 8. The five sets of alternating regions shown in FIG. 2 is for illustrative purposes only. In reality, the number of regions 110, 112 will follow the number of pixel columns of the active display. For example, for a display with 960 columns of resolution, approximately 960 of regions 110, 112 may be provided. A relatively few number of regions 110, 112 are shown in the examples discussed herein for simplicity in explaining the various embodiments.

Figure 5:
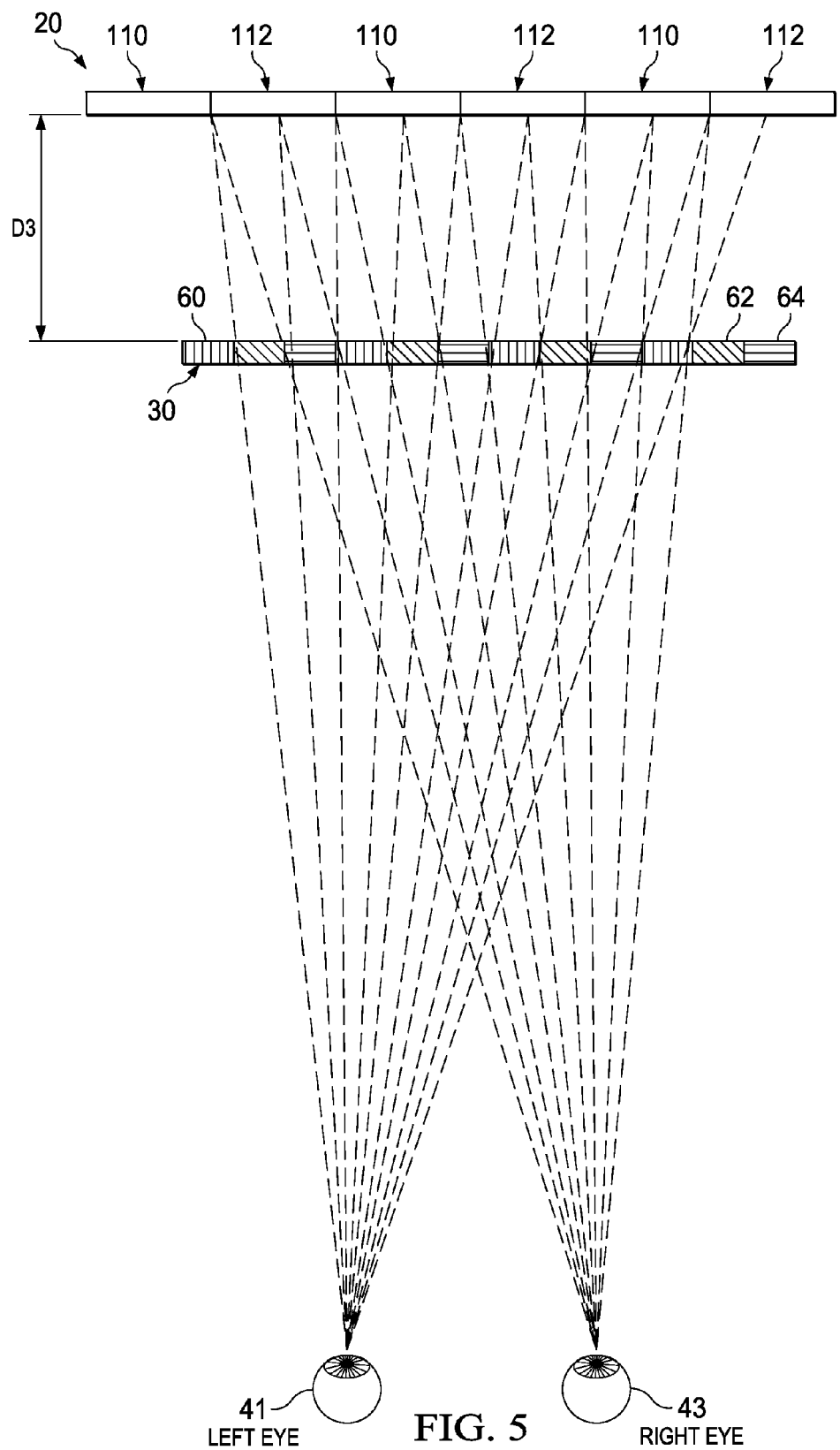
FIG. 5 illustrates the operation of the light guide plate spaced apart from an active display to create 2-D or 3-D images.

The lighting system 20 being able to generate alternating bands of different color light enables a 3-D image to be viewed by viewer 39. FIG. 5 illustrates this principle. The lighting system 20 is shown spaced apart by a distance D3 from the active display 30 in which the LCD pixels are controlled. The alternating dark and lighter regions of the lighting system 20 represent different color light emanating from the alternating regions of orthogonally arranged light extraction features 120, 122.

The active display 30 comprises a plurality of pixels with each pixel comprising a set of red, green, and blue subpixel 60, 62, and 64, respectively. Light generated by the lighting system 20 shines through the various pixels/subpixels and to the viewers left and right eyes 41, 43. Because of the spacing of the viewer's eyes and the spacing D3 between the light guide plate 22 and active display 30, the light that passes through a given subpixel 60-64 to the left eye 41 is a different color than the light that passes through that same subpixel to the right eye 43. Thus, each eye sees a different image thereby producing a 3-D effect.

Figure 6:
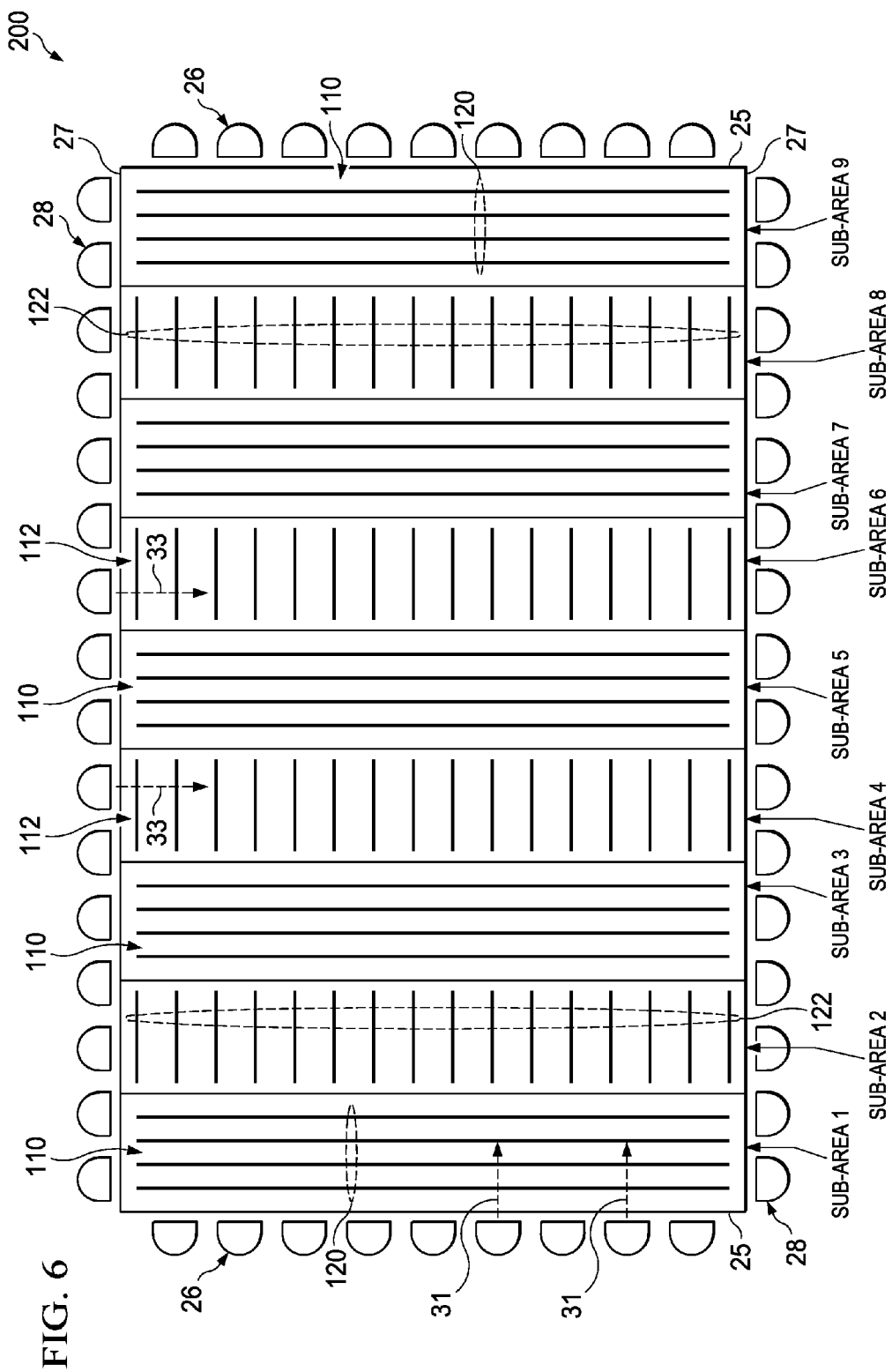
FIG. 6 illustrates an embodiment of light guide plate having two pairs of light arrays.

FIG. 6 depicts an embodiment of a light guide plate 200 similar to that of FIG. 2. The difference is that in FIG. 6 four LED arrays 26, 28 are provided instead of two arrays as in FIG. 2. LED arrays 26 are provided on opposing sides 25, and LED arrays 28 are provided on the orthogonal and opposing sides 26. LED arrays 26 are operated by display control 35 preferably to produce the same color light and LED arrays 28 are also operated preferably to produce the same color light. The light produced by opposing LED array pairs 26 may be the same as (for 2-D operation) or different but complimentary (for 3-D operation) from the light of LED array pairs 28.

FIG. 7a depicts an embodiment of a light guide plate 210 similar to that of FIG. 2. The difference is that in FIG. 7, the spacing between adjacent light extraction features is nonuniform whereas in FIG. 2, the spacing is uniform. In FIG. 7a, within regions 112 the spacing between adjacent light extraction features 122 preferably is greater at the side near the LED array 28 than at the opposite side. As such, the density of light extraction features 122 is smaller close to LED array 28 and greater at the side opposite LED array 28. Thus, D4 is greater in FIG. 7a than D5. In some embodiments, two different inter-light extraction feature spacings are implemented—a larger spacing, for example, in a first portion of the light guide plate 210 nearest the LED array 28 and a smaller spacing in the remaining portion. Other embodiments implement more than two different spacing sizes between light extraction features.

Similarly, the inter-light extraction feature spacings among light extraction features 120 in regions 110 varies with the light extraction features 120 spaced farther apart nearest LED array 26 (i.e., sub-area 1) and closer together towards the opposite side (sub-area 9). Thus, D6 is greater in FIG. 7a than D7. Within a given region 110, the spacing between adjacent light extraction features 120 may be the same or may vary with the spacings being larger distally from the LED array 26. In some embodiments, the spacing between light extraction features 120 is the same among a first group of regions 110 closest to the LED array 26 (e.g., sub-areas 1, 3, and 5) and a second spacing is implemented in the remaining regions 110 (e.g., sub-areas 7 and 9). In other embodiments, more than two different spacings between light extraction features are implemented.

Figure 7B:
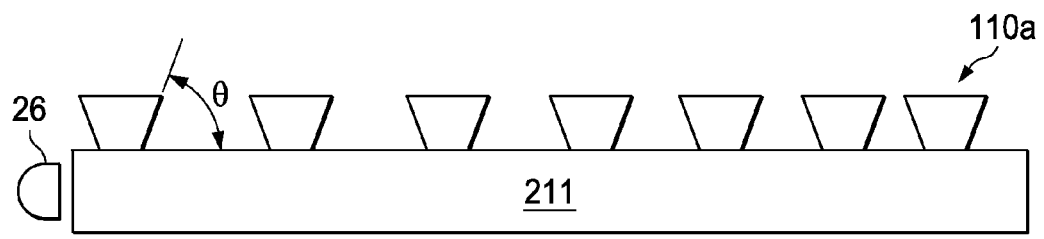
Figure 7C:
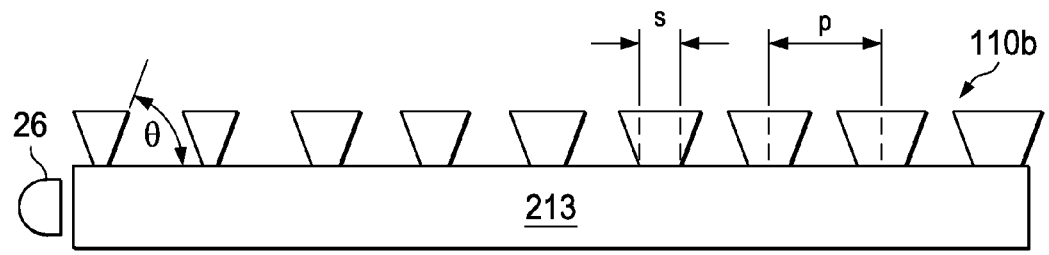
FIG. 7c illustrates an embodiment in which the spacing between adjacent light extraction features is constant but the surface area in contact with each lens varies from one side of the guide to the other.

In general, the density of light extraction features 120 and 122 in FIG. 7a is greatest farthest from the corresponding LED arrays so as to achieve a more uniform light intensity from the light guide plate 22 benefitting both 2-D and 3-D operation. FIG. 7b illustrates an embodiment where uniform intensity is achieved by varying the area in contact of each micro structure. FIG. 7b is a cross sectional view of an edge-lit waveguide 211 and a plurality of light extraction features 110a with side wall angle Θ. Each extraction feature is in the same shape and dimension so the area of contact of the lens tip remains the same. With source light coupled to the waveguide 211 from the left as shown, density is smaller near the source end but larger as it approaches the far end, resulting in a uniform light extraction over the whole area. FIG. 7c illustrates a different embodiment where density remains the same across the whole length, i.e. spacing p between each extraction feature 110b is the same, while size of the lens tip s is smaller near the source and larger at the far end. Side wall angle Θ of each light extraction feature remains the same to allow the extracted light redirected towards the viewer in the same manner.

Figure 8:
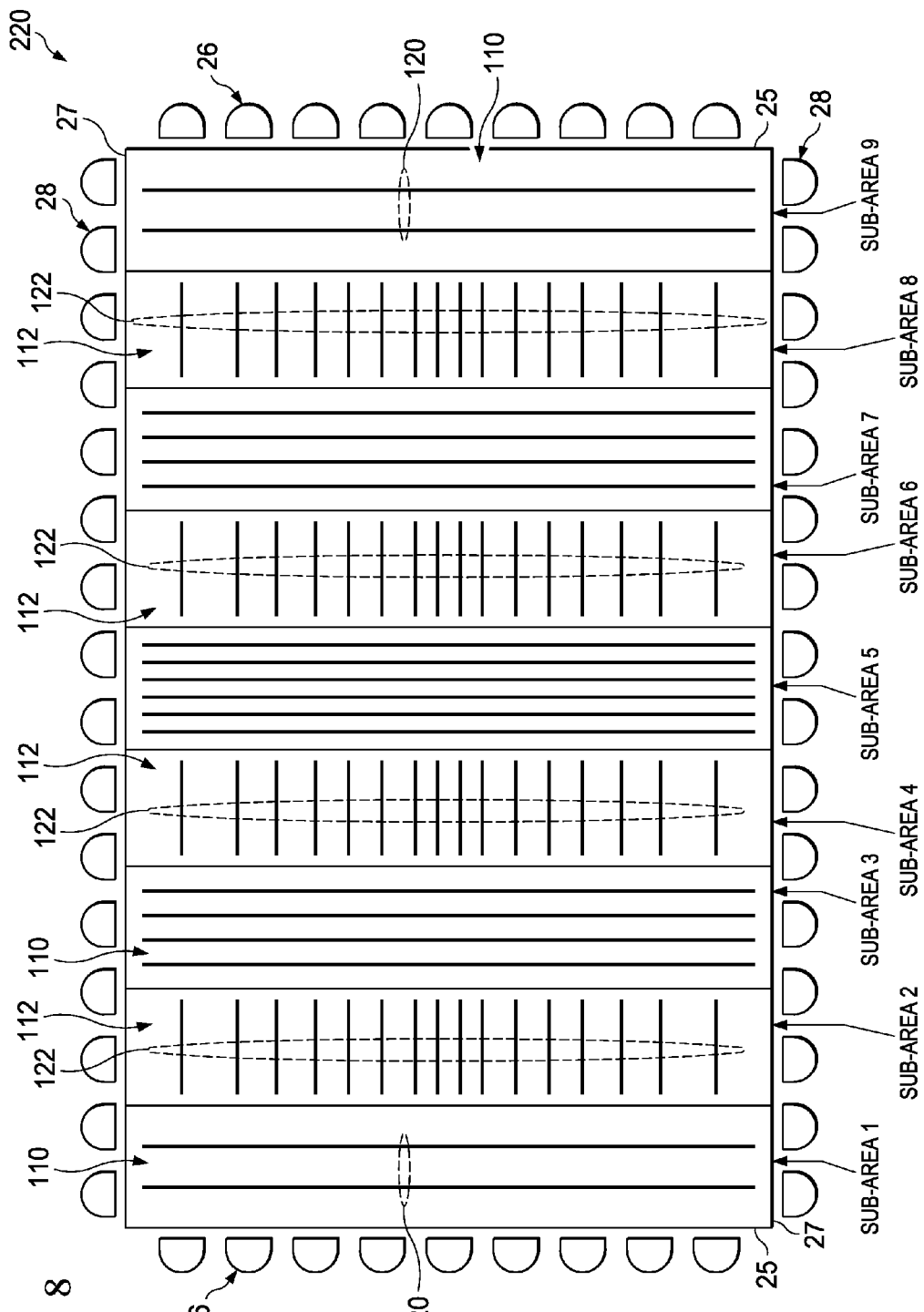
FIG. 8 illustrates an embodiment of light guide plate having two pairs of light arrays and having non-uniform spacing between adjacent light extraction features.

FIG. 8 illustrates an embodiment of a light guide plate 220 in which LED arrays 26 and 28 are provided on opposing sides as for the embodiment of FIG. 6. Further, the spacing between, and density of, the light extraction features 120, 122 is non-uniform. The density of the light extraction features 120, 122 is smallest near the LED arrays 26 and 28 and greatest nearest the middle portion of the light guide plate 220. For example, beginning on the left side of the light guide plate 220, the spacing between adjacent light extraction features 110 is relatively large, progressively becomes smaller towards the left-right center of the plate, and then becomes larger again towards the right side of the plate. Similarly, from the top side of the plate, the spacing between adjacent light extraction features 122 is relatively large, progressively becomes smaller towards the to-bottom center of the plate and then becomes larger again towards the bottom side of the plate. Progressive density variation in the light extraction features as in FIG. 8 creates more uniform light production by the light guide plate.

Figure 9:
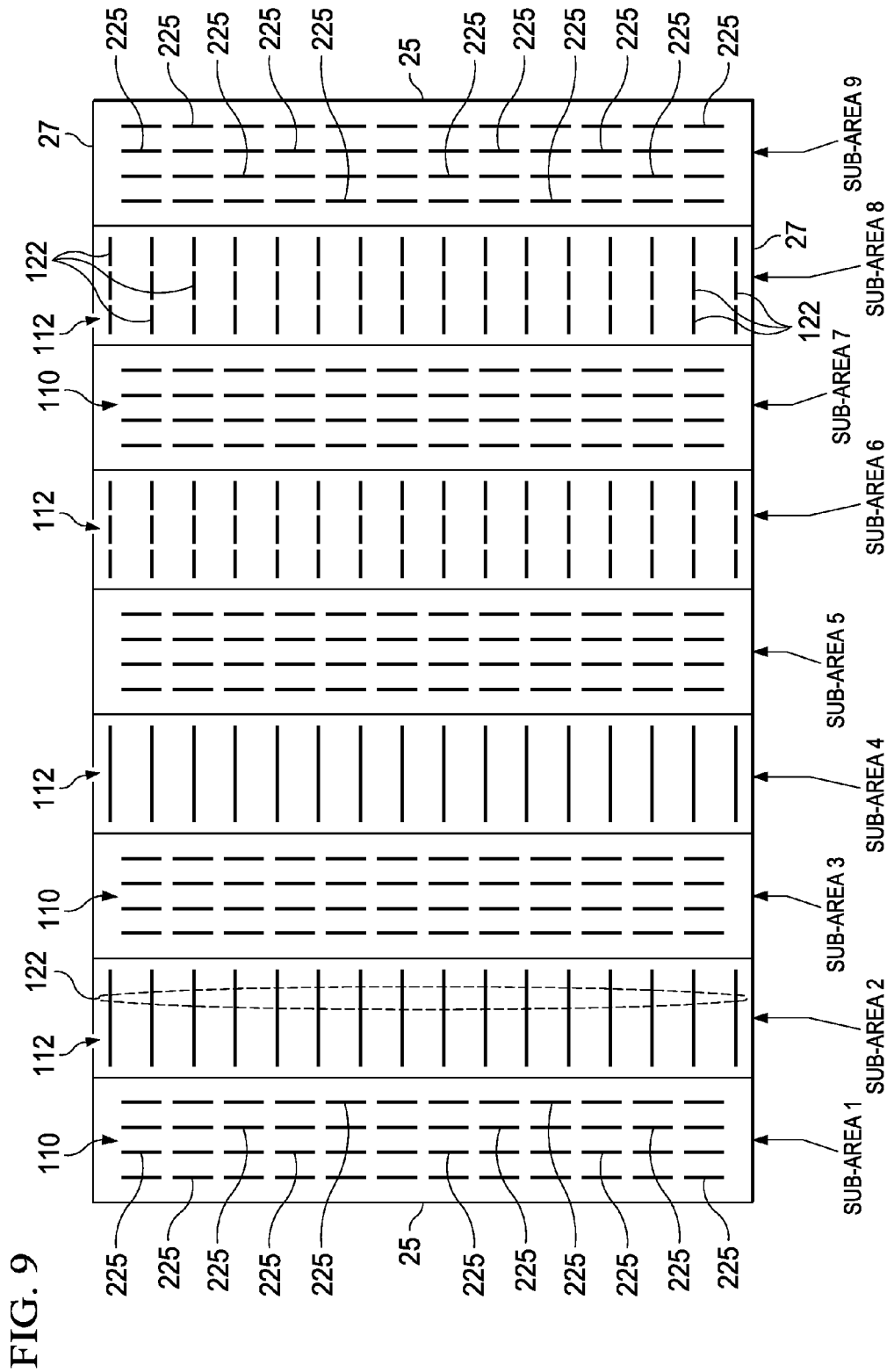
FIG. 9 illustrates an embodiment of light guide plate in which one set of interleaved regions comprises shorter light extraction features arranged in an array.
Figure 10:
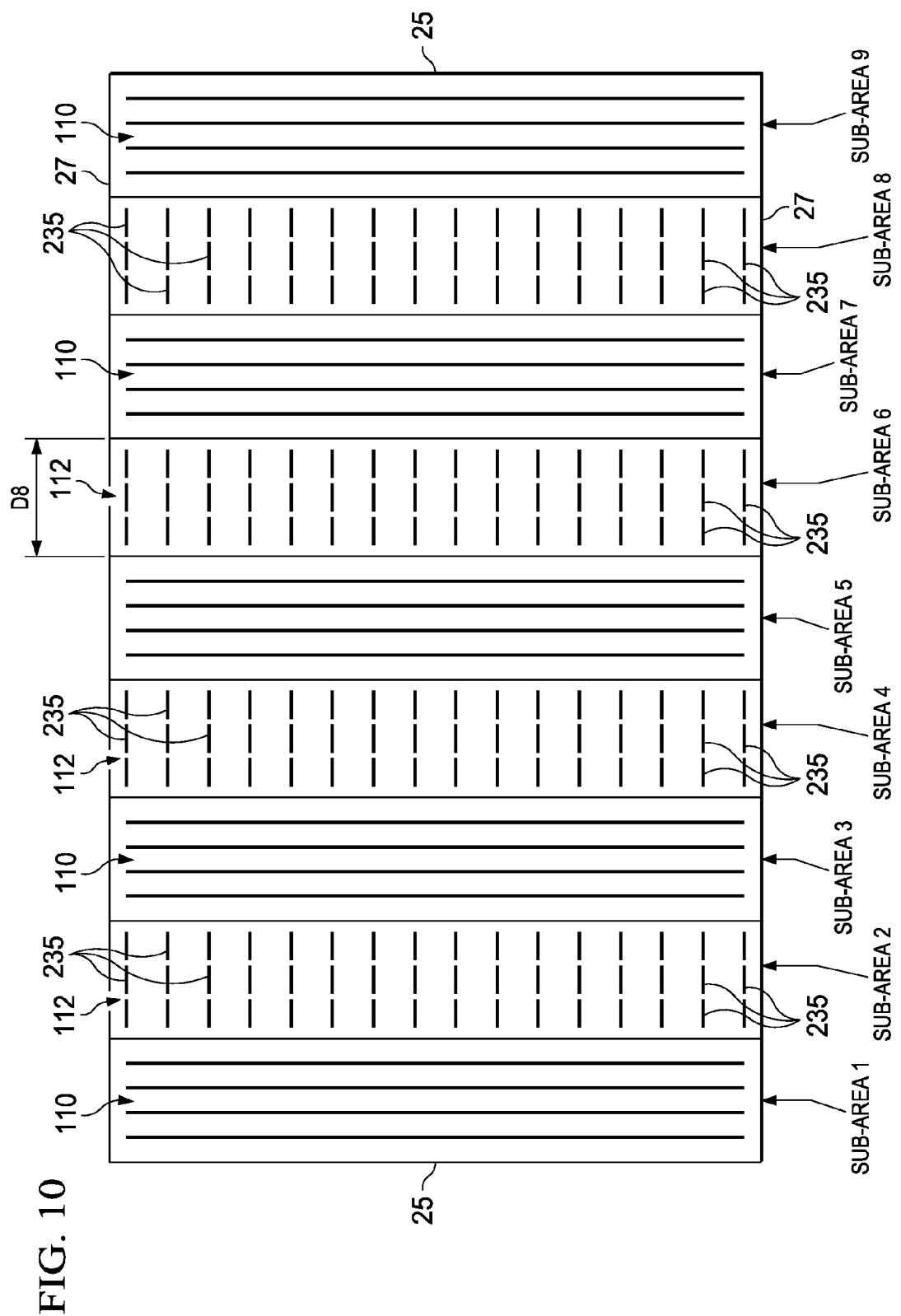
FIG. 10 illustrates an embodiment of light guide plate in which the other set of interleaved regions comprises shorter light extraction features arranged in an array.
Figure 11:
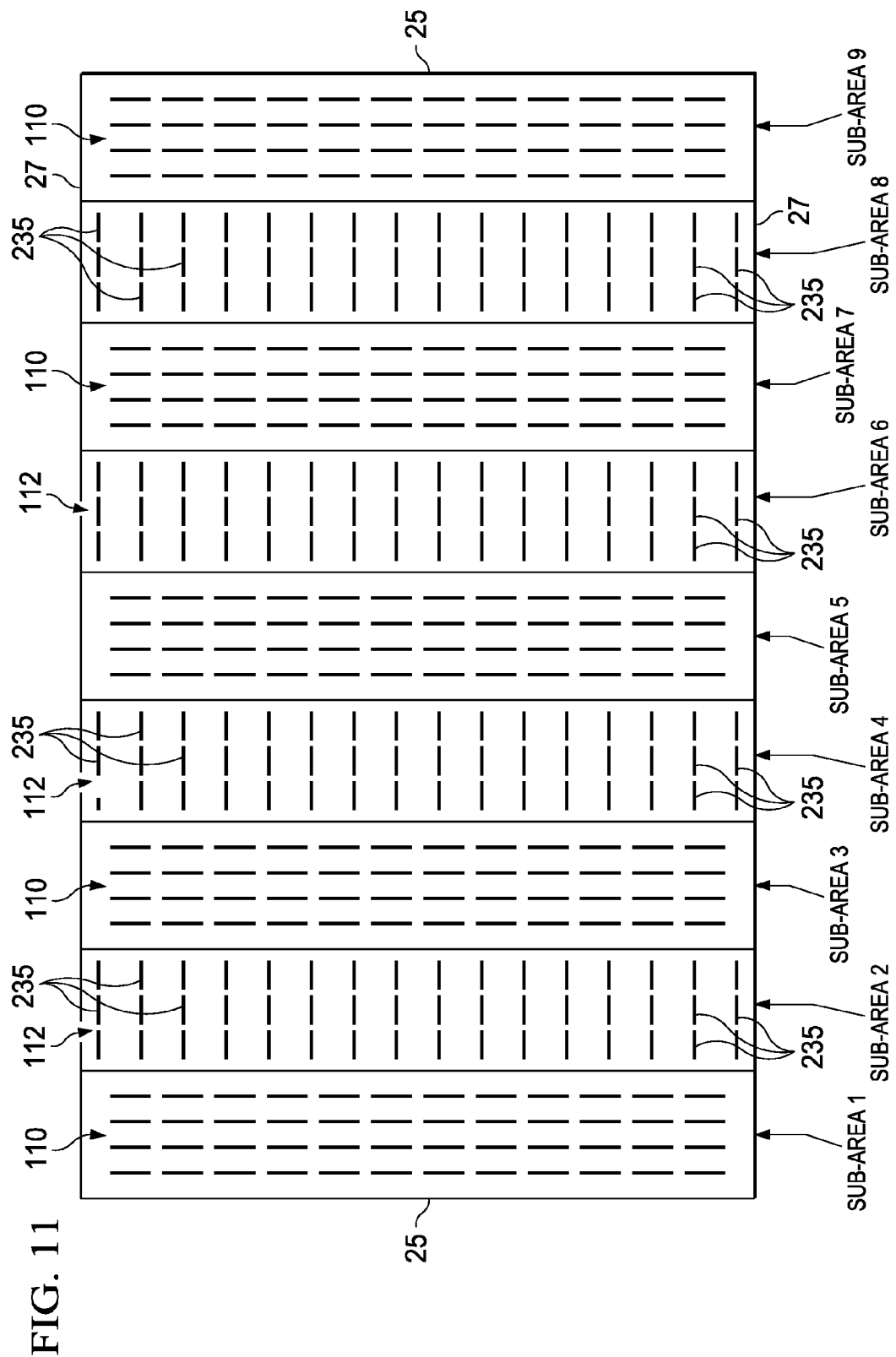
FIG. 11 illustrates an embodiment of light guide plate in which one both sets of interleaved regions comprises shorter light extraction features arranged in arrays.

As noted above, the light extraction features 120, 122 are as long as possible so that only the side face of the features facing the corresponding LED arrays 26, 28 redirects the light towards the viewer effectively. However, in some embodiments (e.g., due to manufacturing cost, and limitation on size and dimensions), the elongated features cannot be easily manufactured in large scale to cover the entire width/length of their respective regions 110, 112. Thus, in some embodiments, shorter light extraction features are implemented compared to those illustrated in the previous embodiments. FIGS. 9-11 illustrate various embodiments in which the light extraction features are broken into multiple elongated structures placed end-to-end on the light guide plate.

FIG. 9 shows that in regions 110, light extraction features 225 have a long dimension that is shorter than light extraction features 120 in previous embodiments. The light extraction features 225 are generally placed end-to-end in a co-linear arrangement as shown albeit not necessarily abutting one another. In some embodiments, the ends of the light extraction features 225 may abut one another. Longer light extraction features are better for extracting light selectivity as the ends of each light extraction feature is generally orthogonal to its long side. This end of the light extraction feature can extract some of the light from the orthogonal light sources. Minimizing the size and number of these ends while optimizing their location improves the overall system performance as it reduces unwanted light leakage. Shorter light extraction features should generally have the length at least 10 times larger than the width in order to suppress undesired light extraction from the source located at its orthogonal direction. The length of these light extraction features is preferably the entire width (for short features) or length (for long features) of the pixel column region (110, 112).

FIG. 10 shows that in regions 112, light extraction features 235 have a long dimension that is shorter than light extraction features 122 in previous embodiments. The light extraction features 235 are generally placed end-to-end as shown albeit not necessarily abutting one another. In some embodiments, the ends of the light extraction features 235 may abut one another.

In FIG. 11 region 110 contains shorter light extraction features 225 provided end-to-end as in FIG. 9. Similarly, region 112 contains shorter light extraction features 235 provided end-to-end as in FIG. 10.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A light guide plate for a backlight, the light guide plate comprising:
   a total internal reflection-based light transmissive medium having two pairs of opposing sides and a top surface, and comprising a plurality of interleaved regions of elongated light extraction features provided on said top surface, each light extraction feature configured to reflect light off of a surface of the light extraction feature to thereby extract light injected into the light guide plate and into a direction that is no longer totally internally reflected within the light guide plate;
   wherein each elongated light extraction feature has a long dimension and a short dimension;
   wherein the light extraction features in a first set of said regions being arranged with their long dimension orthogonal to the long dimension of the light extraction features in a second set of said regions; and
   wherein within at least one of the first and second sets of regions, the light extraction features are arranged in a non-uniformly spaced parallel fashion.

2. The light guide plate of claim 1 wherein the long dimension of the light extraction features in the first set of regions extends for more than half a length of a first side of the light guide plate, and wherein the long dimension of the light extraction features in the second set of regions extends for less than a length of a second side of the light guide plate, the second side being orthogonal to the first side.

3. The light guide plate of claim 1 wherein spacing between adjacent light extraction features within the least one of the first and second sets of regions is greater at the sides of the light guide plate than in the middle of the light guide plate.

4. The light guide plate of claim 1 wherein spacing between adjacent light extraction features within each of the first and second sets of regions is greater at the sides of the light guide plate than in the middle of the light guide plate.

5. The light guide plate of claim 1 wherein spacing of light extraction features in at least one of the first set of regions is different than spacing of light extraction features in at least one other of the first set of regions.

6. The light guide plate of claim 1 wherein the long dimension of the light extraction features in the first set of regions is less than the length of a side of the light guide plate and each of the first set of regions comprises multiple rows of said light extraction features, each row having a plurality of light extraction features arranged co-linearly.

7. The light guide plate of claim 6 wherein each of the second set of regions also comprises multiple rows of light extraction features, each row having a plurality of light extraction features arranged co-linearly and orthogonally respect to the rows of the first set regions.

8. The light guide plate of claim 1 wherein each of the first set of regions abuts at least one of the second set of regions.

9. The light guide plate of claim 1 wherein within at least one of the first and second sets of regions, the light extraction features are arranged in a non-uniformly spaced, parallel fashion, wherein an amount of surface area of at least one light extraction feature in contact with the light guide plate is different from an amount of surface of another light extraction feature in contact with the light guide plate.

10. A lighting system for a display, comprising:
    a total internal reflection-based light guide plate having two pairs of opposing sides, wherein said light guide plate comprises interleaved regions of elongated light extraction features, each elongated light extraction feature having a long dimension and a short dimension, wherein the light extraction features in a first set of regions being arranged with their long dimension orthogonal to the long dimension of the light extraction features in a second set of regions;
    a first light array adjacent a first side of one of the pairs of opposing sides; and
    a second light array adjacent a second side of the other of the pairs of opposing sides, the second side being orthogonal to the first side;
    wherein each light extraction feature configured to reflect light off of a surface of the light extraction feature to thereby extract light injected into the light guide plate and into a direction that is no longer totally internally reflected within the light guide plate; and
    wherein within at east one of the first and second sets of regions, the light extraction features are arranged in a non-uniformly spaced, parallel fashion.

11. The lighting system of claim 10 wherein the long dimension of the light extraction features in the first set of regions extends for more than half a length of a first side of the light guide plate, and wherein the long dimension of the light extraction features in the second set of regions extends for less than a length of a second side of the light guide plate, the second side being orthogonal to the first side.

12. The lighting system of claim 10 wherein spacing between adjacent light extraction features within each of the first and second sets of regions is greater at the sides of the light guide plate than in the middle of the light guide plate.

13. The lighting system of claim 10 wherein spacing between adjacent light extraction features within the least one of the first and second sets of regions is greater at the sides of the light guide plate than in the middle of the light guide plate.

14. The lighting system of claim 13 wherein the spacing is greater at a side adjacent at least one of the light arrays.

15. The lighting system of claim 10 wherein spacing of light extraction features in at least one of the first set of regions is different than spacing of light extraction features in at least one other of the first set of regions.

16. The lighting system of claim 10 wherein the long dimension of the light extraction features in the first set of regions is less than the length of a side of the light guide plate and each of the first set of regions comprises multiple rows of said light extraction features, each row having a plurality of light extraction features arranged co-linearly, and wherein each of the second set of regions also comprises multiple rows of light extraction features, each row having a plurality of light extraction features arranged co-linearly and orthogonally respect to the rows of the first set regions.

17. The lighting system of claim 10 further comprising a third light array and a forth light array, the third light array adjacent a side of the light guide plate opposite the first light array and the fourth light array adjacent a side of the light guide plate opposite the second light array, wherein spacing between adjacent light extraction features within each of the first and second sets of regions is greater at the sides of the light guide plate than in the middle of the light guide plate.

18. A display, comprising:
an active display unit;
a total internal reflection)-based light guide plate separated from the active display unit by a distance and having two pairs of opposing sides, wherein said light guide plate comprises interleaved regions of elongated light extraction features, each elongated light extraction feature having a long dimension and a short dimension, wherein the light extraction features in a first set of regions being arranged with their long dimension orthogonal to the long dimension of the light extraction features in a second set of regions;
a first light array adjacent a first side of the light guide plate; and
a second light array adjacent a second side of the light guide plate and orthogonal to the first side;
wherein each light extraction feature configured to reflect light off of a surface of the light extraction feature to thereby extract light injected into the light guide plate and into a direction that is no longer totally internally reflected the light guide plate; and
wherein within at least one of the first and second sets of regions, the light extraction features are arranged in a non-uniformly spaced, parallel fashion.

19. The display of claim 18 wherein each light extraction feature has a surface area in contact with the light guide plate and the surface area varies from one side of the plate to the other.

20. The display of claim 18 further comprising a display control that causes the first light array to produce a different color light than the second light array.

21. The display of claim 18 wherein the long dimension of the light extraction features in the first set of regions extends for more than half a length of a first side of the light guide plate, and wherein the long dimension of the light extraction features in the second set of regions extends a length of each individual region of the second set of regions, the second side being orthogonal to the first side.

22. The display of claim 18 wherein spacing between adjacent light extraction features within each of the first and second sets of regions is greater at the sides of the light guide plate than in the middle of the light guide plate.

23. The display of claim 18 wherein spacing between adjacent light extraction features within the at least one of the first and second sets of regions is greater at the sides of the light guide plate than in the middle of the light guide plate.

24. The display of claim 23 wherein the spacing is greater at a side adjacent at least one of the light arrays.

25. The display of claim 18 wherein spacing of light extraction features in at least one of the first set of regions is different than spacing of light extraction features in at least one other of the first set of regions.

26. The display of claim 18 wherein the long dimension of the light extraction features in the first set of regions is less the length of a side of the light guide plate and each of the first set of regions comprises multiple rows of said light extraction features, each row having a plurality of light extraction features arranged co-linearly, and wherein each of the second set of regions also comprises multiple rows of light extraction features, each row having a plurality of light extraction features arranged co-linearly and orthogonally respect to the rows of the first set regions.

27. The display of claim 18 further comprising a third light array and a forth light array, the third light array adjacent a side of the light guide plate opposite the first light array and the fourth light array adjacent a side of the light guide plate opposite the second light array, wherein spacing between adjacent light extraction features within each of the first and second sets of regions is greater at the sides of the light guide plate than in the middle of the light guide plate.

* * * * *